US010764225B2

(12) United States Patent
Filip et al.

(10) Patent No.: US 10,764,225 B2
(45) Date of Patent: Sep. 1, 2020

(54) MESSAGING AGGREGATOR SELECTION BASED ON MESSAGE PRIORITY

(71) Applicant: Facebook, Inc., Menlo Park, CA (US)

(72) Inventors: Alexandra Filip, Redwood City, CA (US); Jonathan Bryan McKay, Menlo Park, CA (US); Dingjie Wang, San Jose, CA (US); Anumeha Goel Dhanrajani, San Francisco, CA (US); Seungwon Jeong, Bristol (GB); Nicolas E. Stier-Moses, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 468 days.

(21) Appl. No.: 15/387,564

(22) Filed: Dec. 21, 2016

(65) Prior Publication Data

US 2018/0176169 A1    Jun. 21, 2018

(51) Int. Cl.
*H04L 12/58* (2006.01)
*H04W 4/14* (2009.01)
*G06Q 50/00* (2012.01)
*H04L 29/08* (2006.01)

(52) U.S. Cl.
CPC ............ *H04L 51/26* (2013.01); *G06Q 50/01* (2013.01); *H04L 51/32* (2013.01); *H04W 4/14* (2013.01); *H04L 67/2833* (2013.01)

(58) Field of Classification Search
CPC ......... H04L 51/12; H04L 51/26; H04L 51/32; H04L 67/10; H04L 67/2833; H04L 63/10; H04L 47/50; H04L 51/10; H04W 4/14; H04W 4/12; G06Q 50/01
See application file for complete search history.

(56) References Cited

U.S. PATENT DOCUMENTS

| 7,409,428 | B1 * | 8/2008 | Brabec | H04L 51/34 709/206 |
| 2009/0144387 | A1 * | 6/2009 | Smith | G06Q 10/107 709/207 |
| 2010/0274853 | A1 * | 10/2010 | Carlson | G06Q 20/202 709/204 |
| 2012/0123854 | A1 * | 5/2012 | Anderson | G06Q 30/02 705/14.43 |
| 2012/0246252 | A1 * | 9/2012 | Denise | G06Q 10/107 709/206 |
| 2014/0297772 | A1 * | 10/2014 | LoPorto | H04L 51/32 709/206 |

(Continued)

*Primary Examiner* — Hitesh Patel
(74) *Attorney, Agent, or Firm* — Baker Botts L.L.P.

(57) ABSTRACT

In one embodiment, a method includes determining a reliability score for multiple message aggregators and calculating a rank score for each of the message aggregators. The rank score may be based on a price and the reliability score of the corresponding message aggregator. The method further includes identifying a message type for a queued message. Upon identifying the message type as corresponding to a first message type, the method further includes selecting a first message aggregator of the plurality of message aggregators based on the reliability scores, and upon identifying the message type as corresponding to a second message type, selecting a second message aggregator of the plurality of message aggregators based on the rank scores. Finally, the method includes sending the queued message through the selected message aggregator.

18 Claims, 5 Drawing Sheets

(56) References Cited

U.S. PATENT DOCUMENTS

2015/0312236 A1* 10/2015 Ducker ................. H04L 63/08
  726/4
2016/0173701 A1* 6/2016 Rasiwasia ............. H04M 15/49
  455/406

* cited by examiner

| Messaging-Service Aggregator | Sampling Amount | Reliability score | Cost | |
|---|---|---|---|---|
| Bar Networks | 91 | 0.97 | $0.03 | 32.33 |
| Hello Messaging | 100 | 0.96 | $0.04 | 24 |
| World Messaging | 90 | 0.94 | $0.02 | 47 |
| Orange Networks | 100 | 0.99 | $0.10 | 9.9 |
| Blue Networks | 85 | 0.98 | $0.06 | 16.33 |
| Grape Messaging | 92 | 0.98 | $0.07 | 14 |

*FIG. 3*

MESSAGING AGGREGATOR SELECTION BASED ON MESSAGE PRIORITY

TECHNICAL FIELD

This disclosure generally relates to communications in an online social-networking system.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

Social-graph analysis views social relationships in terms of network theory consisting of nodes and edges. Nodes represent the individual actors within the networks, and edges represent the relationships between the actors. The resulting graph-based structures are often very complex. There can be many types of nodes and many types of edges for connecting nodes. In its simplest form, a social graph is a map of all of the relevant edges between all the nodes being studied.

The social-networking system may send notifications through a communications network to a mobile or other computing device of a user. Notifications may be sent through service aggregators that route the notifications over one or more networks to the destination devices. These service aggregators may charge for routing the notifications, for example, by charging a per message fee.

SUMMARY OF PARTICULAR EMBODIMENTS

In particular embodiments, the social-networking system may determine reliability scores for multiple messaging-service aggregators and calculate a rank for each of the aggregators. The rank may be based on a price per message and the reliability score for each aggregator. As an example and not by way of limitation, the rank may be a ratio of the reliability score over the price per message. The social-networking system may identify the type of a message to be sent. As an example and not by way of limitation, the type may be associated with a priority or importance of the message. Upon identifying that the message is of a predetermined type (e.g., a high priority message), the social-networking system sends the message through a higher reliability aggregator. If the message is of a second type (e.g., a lower priority message), the social-networking system sends the message through a higher ranked aggregator.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 3 illustrates an example messaging-service aggregator table.

DESCRIPTION OF EXAMPLE EMBODIMENTS

Figure 1:
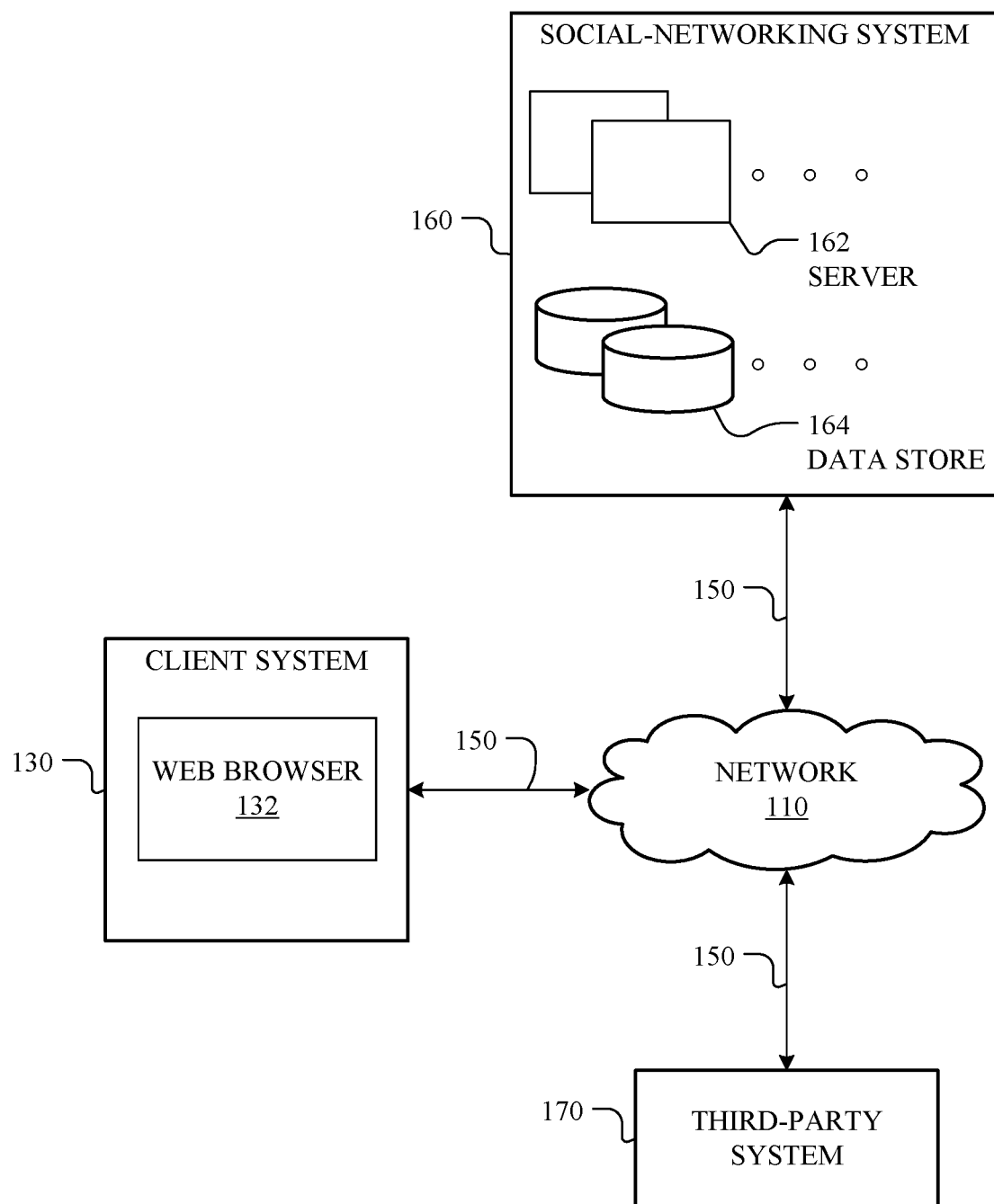
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOC SIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 130. A client system 130 may enable a network user at client system 130 to access network 110. A client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. As an example and not by way of limitation, client system 130 may access social-networking system 160 using a web browser 132, or a native application associated with social-networking system 160 (e.g., a mobile social-networking application, a messaging application, another suitable application, or any combination thereof) either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (e.g., relationships) to a number of other users of social-networking system 160 to whom they want to be connected. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from a client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow a third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in to or opt out of having their actions logged by social-networking system 160 or shared with other systems (e.g., third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page that identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 204 corresponding to a particular photo may have a privacy setting specifying that the photo may only be accessed by users tagged in the photo and their friends. In particular embodiments, privacy settings may allow users to opt in or opt out of having their actions logged by social-networking system 160 or shared with other systems (e.g., third-party system 170). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 170, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers 162 may be authorization/privacy servers for enforcing privacy settings. In response to a request from a user (or other entity) for a particular object stored in a data store 164, social-networking system 160 may send a request to the data store 164 for the object. The request may identify the user associated with the request and may only be sent to the user (or a client system 130 of the user) if the authorization server determines that the user is authorized to access the object based on the privacy settings associated with the object. If the requesting user is not authorized to access the object, the authorization server may prevent the requested object from being retrieved from the data store 164, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

In particular embodiments, the social-networking system 160 may select messaging-service providers for sending messages to users based on a the reliability and costs of messaging-service aggregators available for the user's location and service provider network (SPN), and further based on the message type. Social-networking system 160 may need to send messages to users for various reasons. As an example and not by way of limitation, the social-networking system 160 may request that a user confirm ownership of a phone, as part of a two-step authentication process. When a user logs into the social-networking system from a new mobile device for the first time, the social-networking system may send a message containing a link or code that the user must use to confirm that the user has possession of the mobile device. When a social-networking system 160 sends messages to users, it may select from a variety of messaging-service aggregators to route and deliver the message. As an example and not by way of limitation, a messaging-service aggregator may be an SMS gateway that routes SMS messages from the social-networking system 160 to a user's mobile device. However, sometimes the messages may fail to reach their destination due to errors, failures, system congestion, etc. Since the social-networking system 160 can choose the messaging-service aggregator, the social-networking system 160 may select the aggregator in a manner that increases the likelihood of a successful transmission while balancing that against cost considerations (e.g., using the least expensive route that provides a sufficient likelihood of success).

Figure 2:
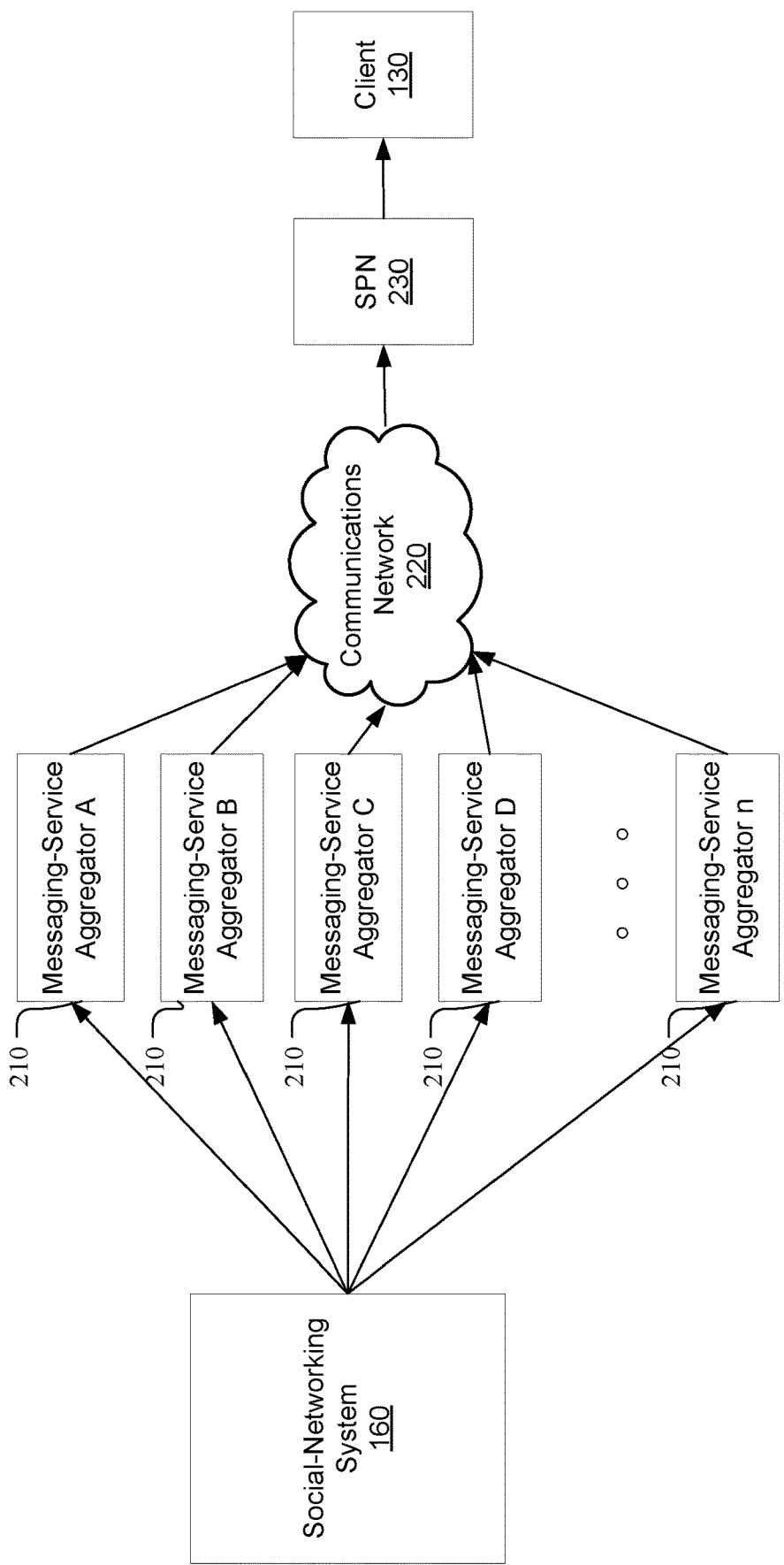
FIG. 2 illustrates an example network environment associated with the messaging-service aggregators used by the social-networking system to send messages.

In particular embodiments, the social-networking system 160 may identify an SPN and a geographic location of a user. An SPN may be a provider of messaging or connectivity services for a user's mobile device, such as, for example, a mobile carrier (e.g., AT&T, Verizon, Sprint, T-Mobile). FIG. 2 illustrates an example network environment associated with the messaging-service aggregators used by the social-networking system to send messages. The social-networking system 160 may utilize any of various messaging-service aggregators 210 to send a message to client 130, which is connected to an SPN 230 by way of communications network 220. As an example and not by way of limitation, the social-networking system 160 may identify that a user's mobile carrier is AT&T, and that the user is located in Canada. The social-networking system 160 may identify an SPN and geographic location using any suitable methods or systems such as, as an example and not by way of limitation, using user-provided information, device-provided information, SIM-card information, or social-graph information associated with the user. In connection with identifying a mobile SPN of a user of the online social network, particular embodiments may utilize one or more systems, components, elements, functions, methods, operations, or steps disclosed in U.S. patent application Ser. No. 13/922,144, filed 19 Jun. 2013, which is incorporated by reference. As another example and not by way of limitation, social-networking system 160 may identify a geographic location of the user by accessing location sensor data from the user's mobile device, or from an IP address of the user. Although this disclosure describes identifying an SPN and geographic location of the user in a particular manner, this disclosure contemplates identifying an SPN and geographic location of the user in any suitable manner.

In particular embodiments, each messaging-service aggregator may have a price per message sent. As an example and not by way of limitation, social-networking system 160 may hold an auction to set prices for messages sent through SMS aggregators for a particular period of time (e.g., the month of August). In such an example, an auction may be held where multiple SMS aggregators bid on pricing for an amount of messages during the period to particular SPNs and geographic locations. In particular embodiments, social-networking system 160 holds multiple auctions to set prices for multiple SPNs and geographic regions.

In particular embodiments, the social-networking system 160 may access a messaging-aggregator table associated with the identified mobile SPN for the geographic location, wherein the messaging-aggregator table indexes a reliability score and a sampling amount for each of a plurality of messaging-service aggregators in the geographic location. FIG. 3 illustrates an example messaging-service aggregator table. In particular embodiments, the social-networking system 160 may maintain indexed tables of available messaging-service aggregators for various geographic location and SPN pairs. A messaging-service aggregator may be any network or service suitable for transmitting messages to a user. In particular embodiments, the messaging service aggregator is an SMS gateway provider and the messages are short message service (SMS) messages. In particular embodiments, the messages may be multimedia messaging service (MMS) messages, push notifications, or voice messages. An SPN may be any service provider network that delivers messages to the user, such as, as an example and not by way of limitation, a mobile service carrier, an internet service provider, an email hosting service, etc. As an example and not by way of limitation, the social-networking system 160 may maintain separate messaging-service aggregator tables for AT&T and Canada, for Verizon and Canada, for AT&T and U.S. West Coast, for Verizon and U.S. West Coast, etc.

Each of the messaging aggregator tables may maintain reliability scores and sampling amounts for various messaging-service aggregators available for sending messages to users serviced by the corresponding SPN in the particular location. As an example and not by way of limitation, if Aggregator A, Aggregator B, and Aggregator C are available for sending messages to users connecting through AT&T in Canada, the social-networking system 160 may maintain tables listing a reliability score and sampling amount for each of Aggregator A, Aggregator B, and Aggregator C for messages sent to users connecting through AT&T in Canada. When preparing to send a message to a user, the social-networking system 160 may access the corresponding table to select a suitable messaging-service aggregator based on the user's SPN and geographic location. Although this disclosure describes maintaining aggregator reliability scores in a particular manner, this disclosure contemplates maintaining aggregator reliability scores in any suitable manner.

In particular embodiments, social-networking system 160 may measure the reliability of messaging-service aggregators by determining what ratio of sent messages were received by the corresponding recipients. In particular embodiments, the social-networking system 160 determines that a particular message was successfully delivered when an action responsive to the particular message is detected. The social-networking system 160 may assume for purposes of sampling that a message was not successfully delivered to a recipient if no response message is received from the user. However, in particular embodiments, the recipient or the messaging-service aggregator may omit sending an explicit response to the message. As an example and not by way of limitation, the message may be an SMS message asking a user click on a link to confirm that the user has possession of a device being used to access a social-networking account (e.g., "Please confirm your device by visiting the link http://fb.com/2345abc"). When the user clicks on the link, the social-networking system 160 is informed, and therefore determines that the user has received the message. In particular embodiments, the social-networking system 160 determines that a particular message was not successfully delivered when a response to the particular message is not received before a pre-determined amount of time elapses. As an example and not by way of limitation, if the user does not click on the link within a particular amount of time, e.g., 5 minutes, the social-networking system 160 may assume that the user did not receive the message. As another example and not by way of limitation, the message may be an SMS messaging notifying a user that a friend has mentioned the user in a social-networking post. If the user then logs into the social-networking system 160 before a pre-determined amount of time elapses, the social-networking system may determine that the message was received. As another example and not by way of limitation, if the user performs an action in the social-networking system responsive to the message (e.g., post a comment, accept a friend request, etc.) within the pre-determined time period, the social-networking system may determine that the message was received. Actions responsive to a message may include any suitable social-networking activity such as, by way of example and not limitation, logging into the social-networking system, visiting a link included in the message, submitting "Likes", commenting on posts, posting to the social-networking system, submitting a "check-in," responding to a friend request, tagging an image, messaging a user of the social-networking system, accessing content on the social-networking system, etc.

Additionally, FIG. 3 shows that the messaging aggregator tables may include a rank for each of the aggregators. In particular embodiments, the rank score may represent a tradeoff between reliability and pricing. As an example and not by way of limitation, the rank score may be a ratio of the reliability score over the price, as shown in the example of FIG. 3. It should be understood that the ratio of price over reliability may be used in analogous fashion. In particular embodiments, data in the messaging aggregator tables may be updated based on changes in the reliability score.

In particular embodiments, social-networking system 160 may use the reliability score and/or the rank to choose a messaging-service aggregator from the table. In particular embodiments, social-networking system 160 may choose which metric to use based on a type of message to be sent. In particular embodiments, social-networking system 160 may choose a messaging-service aggregator to send messages that are considered of a lower priority based on the ranks of the aggregators, and choose a messaging service aggregator to send messages that are considered of a higher priority based on the reliability scores of the aggregators. As an example and not by way of limitation, social-networking system 160 may consider certain notifications to be of high priority, such as an SMS for two-factor authentication (e.g., "Please visit http://fb.auth/1234xyz to confirm your account."). Social-networking system 160 may send a higher priority message through a messaging-service aggregator with a high, or highest, reliability score, thus not taking into account pricing. As an example and not by way of limitation, social-networking system 160 may consider some messages to be of a lesser priority, such as birthday reminders, social network activity, etc. Social-networking system 160 may send a lower priority message through a messaging-service aggregator with a high, or highest, rank, thus choosing a messaging-service aggregator that provides a balance between price and reliability.

As an example and not by way of limitation, social-networking system 160 may generate a birthday reminder notification to send to a user. Assuming social-networking system considers the birthday reminder a low priority message, the social-networking system 160 may select a highest rank network to send the message, e.g., World Messaging with a rank of 47 in the example of FIG. 3. Thus, social-networking system may optimize the reliability for the amount of money spent. As an example and not by way of limitation, social-networking system 160 may generate a two-factor authentication message that is high priority. Social-networking system 160 may then select Orange Networks with a reliability score of 0.99 to deliver the message, regardless of the pricing.

In particular embodiments, social-networking system 160 may categorize the priority of messages based on their historical or expected response rate. Social-networking system 160 may be configured to prioritize the delivery of messages that have a higher likelihood to cause the recipient to login or interact with social-networking system 160. As an example and not by way of limitation, birthday reminders may have a response rate of 30%, while two-factor authentication messages may have a response rate of 95%. In particular embodiments, social-networking system 160 may categorize messages that exceed a designated threshold response rate as high priority, and those that don't as low priority. As an example and not by way of limitation, if the threshold rate is 80%, birthday reminders would have a low priority and two-factor authentication messages would have a high priority in the above example.

In particular embodiments, social-networking system 160 may additionally group reliability and rank scores based on quality-of-service (QoS) categories assigned to users. As an example and not by way of limitation, a designated number or portion of the highest ranking or highest reliability messaging-service aggregators may be assigned to users with an assigned higher QoS.

Figure 4:
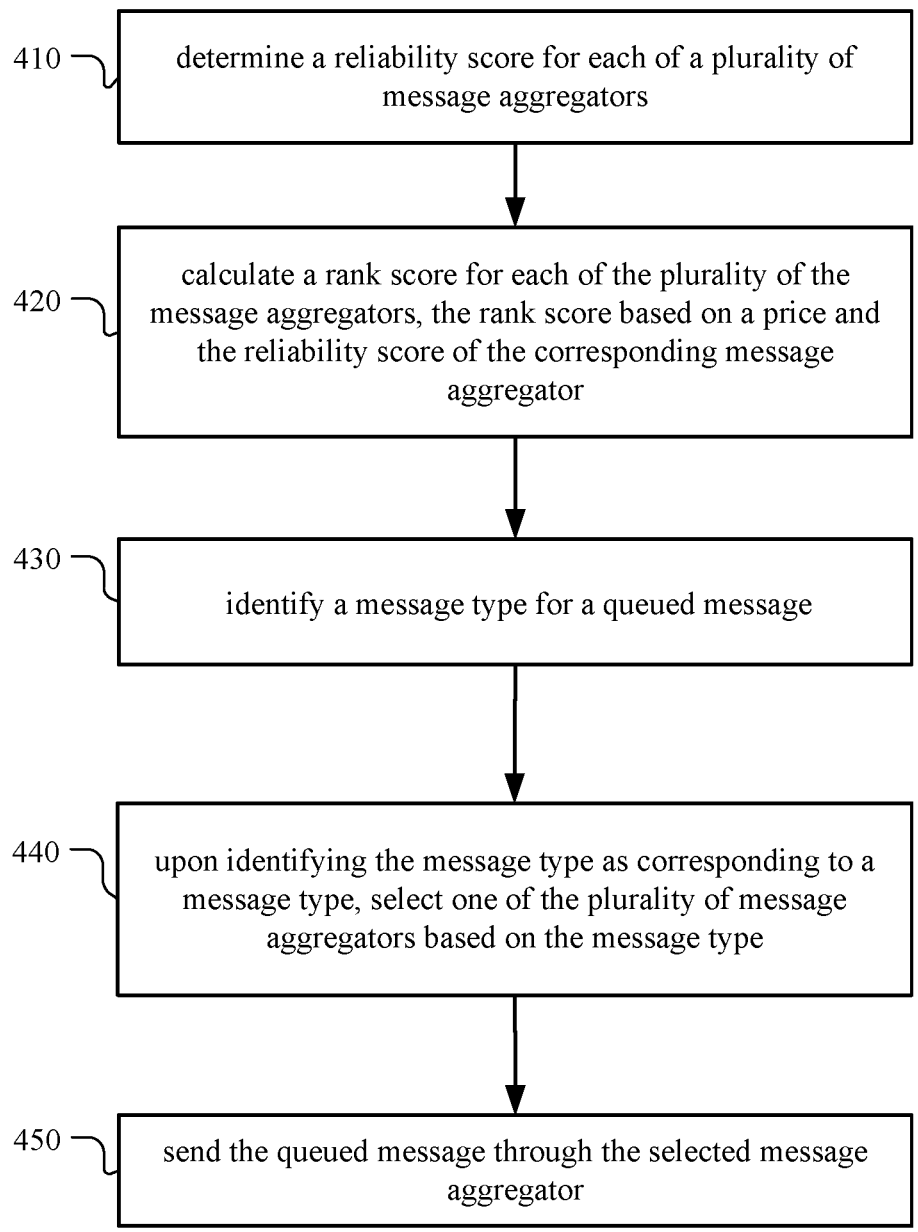
FIG. 4 illustrates an example method 400 for selecting a messaging-service aggregator.

FIG. 4 illustrates an example method 400 for selecting a messaging-service aggregator. The method may begin at step 410, where social-networking system 160 may determine a reliability score for each of a plurality of message aggregators. The reliability score may be based on a conversion rate for a plurality of messages previously transmitted using the message aggregator. At step 420, social-networking system 160 may calculate a rank score for each of the message aggregators, wherein the rank score is based on a price and the reliability score of the corresponding message aggregator. At step 430, social-networking system 160 may identify a message type for a queued message. At step 440, social-networking system 160 may, upon identifying the message type as corresponding to a first message type, select one of the message aggregators based on the message type. At step 450, social-networking system 160 may send the queued message through the selected message aggregator. Particular embodiments may repeat one or more steps of the method of FIG. 4, where appropriate.

In particular embodiments, a pacing mechanism may determine whether to send a message or not in order to avoid exceeding a messaging budget. For example, the messaging budget may specify a target goal of 50% of the available budget. Based on the portion of the budget that has already been consumed to-date, the pacing mechanism may adjust the quantity and rate at which messages are sent out (e.g., by determining on a per-message basis whether to drop or send each message) based on reliability score, price, and priority. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates an example method for selecting a messaging-service aggregator including the particular steps of the method of FIG. 4, this disclosure contemplates any suitable method for selecting a messaging-service aggregator including any suitable steps, which may include all, some, or none of the steps of the method of FIG. 4, where appropriate. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

Figure 5:
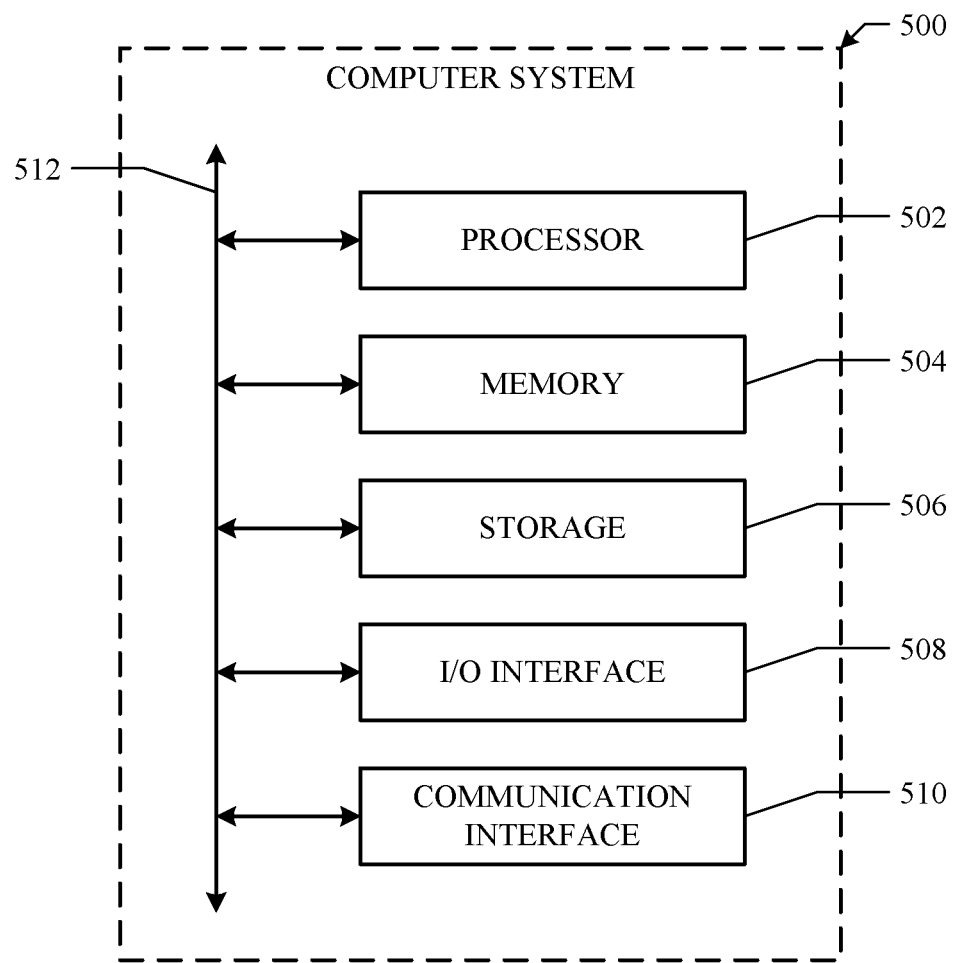
FIG. 5 illustrates an example computer system.

FIG. 5 illustrates an example computer system 500. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A computer-implemented method comprising:
   by a social-networking system, identifying a particular geographic location and a particular service provider network of a client device of a user;
   by the social-networking system, accessing a messaging-service aggregator table corresponding to the particular geographic location and the particular service provider network of the client device of the user, the messaging-service aggregator table comprising a plurality of message aggregators that are configured for sending messages to users connecting through the particular service provider network in the particular geographic location;
   by the social-networking system, determining a reliability score for each of the plurality of message aggregators, the reliability score for each respective message aggregator being based on a conversion rate for a plurality of messages transmitted using the message aggregator;
   by the social-networking system, calculating a rank score for each of the plurality of the message aggregators, the rank score based on a price and the reliability score of the corresponding message aggregator;
   by the social-networking system, comparing an expected response rate of a queued message with a designated threshold response rate;
   by the social-networking system, categorizing a priority of the queued message into a particular message type based on comparison of the expected response rate of the queued message with the designated threshold response rate;

by the social-networking system, grouping the reliability scores and rank scores for the plurality of message aggregators based on the particular geographic location of a recipient of the queued message;

by the social-networking system, selecting a message aggregator from the messaging-service aggregator table to send the queued message of the particular message type, wherein the message aggregator is selected from the messaging-service aggregator table corresponding to the particular geographic location of the recipient of the queued message; and by the social-networking system, sending the queued message through the selected message aggregator to the client device of the user.

2. The computer-implemented method of claim 1, wherein each of the rank scores comprises a ratio of the respective reliability score for the message aggregator and the price.

3. The computer-implemented method of claim 1, wherein the particular message type comprises a type of message having a response rate typically exceeding the designated threshold response rate.

4. The computer-implemented method of claim 1, wherein the particular message type comprises any type of message having a response rate that typically does not exceed the designated threshold response rate.

5. The computer-implemented method of claim 1, wherein the plurality of message aggregators comprise short message service (SMS) aggregators.

6. The computer-implemented method of claim 1, further comprising:

grouping the reliability scores and rank scores for the plurality of message aggregators further based on the particular service provider network of the recipient of the queued message; and wherein the message aggregator is further selected from the messaging-service aggregator table corresponding to the particular service provider network of the recipient of the queued message.

7. The computer-implemented method of claim 1, further comprising:

grouping the reliability scores and rank scores for the plurality of message aggregators further based on a quality-of-service level assigned to the recipient of the queued message; and wherein the message aggregator is further selected from the messaging-service aggregator table corresponding to the quality-of-service level assigned to the recipient of the queued message.

8. The computer-implemented method of claim 1, wherein the conversion rate is based on:

a reply rate for the messages transmitted using the message aggregator;

a click-through rate for the messages transmitted using the message aggregator; or a view rate for the messages transmitted using the message aggregator.

9. The computer-implemented method of claim 1, wherein:

if the particular message type of the queued message is of a relatively high priority, then the message aggregator is selected from the messaging-service aggregator table based on the reliability score associated with the message aggregator.

10. The computer-implemented method of claim 1, wherein:

if the particular message type of the queued message is of a relatively low priority, then the message aggregator is selected from the messaging-service aggregator table based on the rank score associated with the message aggregator.

11. One or more computer-readable non-transitory storage media embodying software that when executed by one or more processors, causes the one or more processors to:

identify a particular geographic location and a particular service provider network of a client device of a user;

access a messaging-service aggregator table corresponding to the particular geographic location and the particular service provider network of the client device of the user, the messaging-service aggregator table comprising a plurality of message aggregators that are configured for sending messages to users connecting through the particular service provider network in the particular geographic location;

determine a reliability score for each of the plurality of message aggregators, the reliability score for each respective message aggregator being based on a conversion rate for a plurality of messages transmitted using the message aggregator;

calculate a rank score for each of the plurality of the message aggregators, the rank score based on a price and the reliability score of the corresponding message aggregator;

compare an expected response rate of a queued message with a designated threshold response rate;

categorize a priority of the queued message into a particular message type based on comparison of the expected response rate of the queued message with the designated threshold response rate;

group the reliability scores and rank scores for the plurality of message aggregators based on the particular geographic location of a recipient of the queued message;

select a message aggregator from the messaging-service aggregator table to send the queued message of the particular message type, wherein the message aggregator is selected from the messaging-service aggregator table corresponding to the particular geographic location of the recipient of the queued message; and send the queued message through the selected message aggregator to the client device of the user.

12. The one or more computer-readable non-transitory storage media of claim 11, wherein each of the rank scores comprises a ratio of the respective reliability score for the message aggregator and the price.

13. The one or more computer-readable non-transitory storage media of claim 11, wherein the particular message type comprises a type of message having a response rate typically exceeding the designated threshold response rate.

14. The one or more computer-readable non-transitory storage media of claim 11, wherein the particular message type comprises any type of message having a response rate that typically does not exceed the designated threshold response rate.

15. The one or more computer-readable non-transitory storage media of claim 11, wherein the plurality of message aggregators comprise short message service (SMS) aggregators.

16. The one or more computer-readable non-transitory storage media of claim 11, wherein the software when executed by the one or more processors, further causes the one or more processors to:

group the reliability scores and rank scores for the plurality of message aggregators further based on the particular service provider network of the recipient of the queued message; and wherein the message aggregator is further selected from the messaging-service aggregator table corresponding to the particular service provider network of the recipient of the queued message.

17. The one or more computer-readable non-transitory storage media of claim 11, wherein the software when executed by the one or more processors, further causes the one or more processors to:

group the reliability scores and rank scores for the plurality of message aggregators further based on a quality-of-service level assigned to the recipient of the queued message; and wherein the message aggregator is further selected from the messaging-service aggregator table corresponding to the quality-of-service level assigned to the recipient of the queued message.

18. A system comprising one or more processors and a memory coupled to the processors comprising instructions that when executed by the processors, cause the processors to:

identify a particular geographic location and a particular service provider network of a client device of a user;

access a messaging-service aggregator table corresponding to the particular geographic location and the particular service provider network of the client device of the user, the messaging-service aggregator table comprising a plurality of message aggregators that are configured for sending messages to users connecting through the particular service provider network in the particular geographic location;

determine a reliability score for each of the plurality of message aggregators, the reliability score for each respective message aggregator being based on a conversion rate for a plurality of messages transmitted using the message aggregator;

calculate a rank score for each of the plurality of the message aggregators, the rank score based on a price and the reliability score of the corresponding message aggregator;

compare an expected response rate of a queued message with a designated threshold response rate;

categorize a priority of the queued message into a particular message type based on comparison of the expected response rate of the queued message with the designated threshold response rate;

group the reliability scores and rank scores for the plurality of message aggregators based on the particular geographic location of a recipient of the queued message;

select a message aggregator from the messaging-service aggregator table to send the queued message of the particular message type, wherein the message aggregator is selected from the messaging-service aggregator table corresponding to the particular geographic location of the recipient of the queued message; and send the queued message through the selected message aggregator to the client device of the user.

* * * * *